US010787062B2

(12) United States Patent
Lee

(10) Patent No.: US 10,787,062 B2
(45) Date of Patent: Sep. 29, 2020

(54) DAMPER ASSEMBLY OF VEHICLE AIR VENT

(71) Applicant: NIFCO KOREA INC., Asan-si, Chungcheongnam-do (KR)

(72) Inventor: Soo Young Lee, Asan-si (KR)

(73) Assignee: NIFCO KOREA INC., Asan-si, Chungcheongnam-Do (KR)

(*) Notice: Subject to any disclaimer, the term of this patent is extended or adjusted under 35 U.S.C. 154(b) by 165 days.

(21) Appl. No.: 15/737,136

(22) PCT Filed: Aug. 18, 2016

(86) PCT No.: PCT/KR2016/009125
§ 371 (c)(1),
(2) Date: Dec. 15, 2017

(87) PCT Pub. No.: WO2017/030398
PCT Pub. Date: Feb. 23, 2017

(65) Prior Publication Data
US 2018/0194201 A1   Jul. 12, 2018

(30) Foreign Application Priority Data
Aug. 18, 2015  (KR) .................. 10-2015-0116191

(51) Int. Cl.
*B60H 1/34* (2006.01)
*F24F 13/14* (2006.01)
(52) U.S. Cl.
CPC ... *B60H 1/3421* (2013.01); *B60H 2001/3478* (2013.01); *F24F 2013/1446* (2013.01)
(58) Field of Classification Search
CPC ............................................. F24F 2013/1446
(Continued)

(56) References Cited

U.S. PATENT DOCUMENTS 3,602,127 A * 8/1971 Walker ................ B60H 1/3428
454/316
6,780,098 B2 * 8/2004 Nishida ............... B60H 1/3414
454/155
(Continued)

FOREIGN PATENT DOCUMENTS

CN        102892602 A      1/2013
DE    102005035768 A1 *   2/2006  ............... B60H 1/34
(Continued)

OTHER PUBLICATIONS

Europe Patent Office, "Search Report for European Patent Application No. 16837340.5," dated Mar. 22, 2019.
(Continued)

*Primary Examiner* — Edelmira Bosques
*Assistant Examiner* — Frances F. Hamilton
(74) *Attorney, Agent, or Firm* — Manabu Kanesaka

(57) ABSTRACT

A dual damper device or damper assembly of a vehicle air vent includes a dial support; a dial knob coupled with the dial support so as to rotate in one direction or another direction; a gear bush having an upper end portion coupled to a bottom of the dial knob, and a pinion gear formed at a lower portion; a guide gear having a rack gear part at one side thereof and engaging the pinion gear so as to move forward or backward; and a damper provided to an air channel of a duct housing so as to rotate in one side direction or another side direction. The damper is coupled to the guide gear so that the damper moves according to an amount of a forward or backward movement of the guide gear.

6 Claims, 4 Drawing Sheets

(58) Field of Classification Search
USPC .......................................................... 454/155
See application file for complete search history.

(56) References Cited

U.S. PATENT DOCUMENTS

| | | | | |
|---|---|---|---|---|
| 6,893,338 | B2* | 5/2005 | Katagiri | B60H 1/3421 |
| | | | | 454/155 |
| 7,018,288 | B2* | 3/2006 | Okada | B60H 1/3421 |
| | | | | 454/155 |
| 7,229,348 | B2* | 6/2007 | Shibata | B60H 1/3421 |
| | | | | 454/155 |
| 7,575,510 | B2* | 8/2009 | Kim | B60H 1/3428 |
| | | | | 454/155 |
| 9,937,774 | B2* | 4/2018 | Brinas | B60H 1/3421 |
| 10,076,947 | B2* | 9/2018 | Lee | B60H 1/3414 |
| 10,239,385 | B2* | 3/2019 | Shibata | B60H 1/345 |
| 10,328,773 | B2* | 6/2019 | Kim | B60H 1/0065 |
| 10,343,494 | B2* | 7/2019 | Ahn | B60H 1/3421 |
| 2003/0050001 | A1* | 3/2003 | Kamio | B60H 1/345 |
| | | | | 454/155 |
| 2003/0157880 | A1* | 8/2003 | Nishida | B60H 1/3414 |
| | | | | 454/155 |
| 2005/0239391 | A1* | 10/2005 | Shibata | B60H 1/3421 |
| | | | | 454/155 |
| 2011/0319005 | A1* | 12/2011 | Sawada | B60H 1/00678 |
| | | | | 454/155 |
| 2016/0052368 | A1* | 2/2016 | Zhang | B60H 1/3414 |
| | | | | 454/154 |
| 2017/0259649 | A1* | 9/2017 | Shibata | B60H 1/3421 |
| 2017/0305238 | A1* | 10/2017 | Brinas | B60H 1/00564 |
| 2017/0341488 | A1* | 11/2017 | Kim | B60H 1/3421 |
| 2018/0170153 | A1* | 6/2018 | Lee | B60H 1/3421 |
| 2019/0001790 | A1* | 1/2019 | Demerath | B60H 1/3421 |

FOREIGN PATENT DOCUMENTS

| | | | | |
|---|---|---|---|---|
| FR | 2457190 A1 | * | 12/1980 | ............. F24F 13/15 |
| FR | 3037283 A1 | * | 12/2016 | ........... B60K 11/085 |
| GB | 1441578 A | * | 7/1976 | ........... F24F 13/065 |
| JP | H01-204817 A | | 8/1989 | |
| JP | H02-64417 U | | 5/1990 | |
| JP | H08-291936 A | | 11/1996 | |
| JP | 2001-219736 A | | 8/2001 | |
| JP | 2001219736 A | * | 8/2001 | ............. B60H 1/34 |
| JP | 2010-052649 A | | 3/2010 | |
| JP | 2010052649 A | * | 3/2010 | |
| KR | 20-2000-0014847 U | | 7/2000 | |
| KR | 10-2005-0047902 A | | 5/2005 | |
| KR | 20060016344 A | * | 2/2006 | ............. B60H 1/34 |
| KR | 10-0736981 B1 | | 7/2007 | |
| KR | 100736981 B1 | * | 7/2007 | |
| KR | 10-2009-0132178 A | | 12/2009 | |
| KR | 10-2012-0002664 A | | 1/2012 | |

OTHER PUBLICATIONS

PCT/ISA/210, "International Search Report for International Application No. PCT/KR2016/009125," dated Nov. 18, 2016.
China Patent Office, "Office Action for Chinese Patent Application No. 201680034229.4," dated Sep. 29, 2019.

* cited by examiner

DAMPER ASSEMBLY OF VEHICLE AIR VENT

RELATED APPLICATIONS

The present application is National Phase of International Application No. PCT/KR2016/009125 filed Aug. 18, 2016, and claims priority from Korean Application No. 10-2015-0116191, filed Aug. 18, 2015, the disclosure of which is hereby incorporated by reference herein in its entirety.

TECHNICAL FIELD

The present invention relates to a dual damper device or damper assembly of a vehicle air vent and, more particularly, to a dual damper device or damper assembly of a vehicle air vent, in which the opening or closing amount of the air channel of an air vent housing can be adjusted while a damper provided to the air channel of the air vent housing accurately rotates according to the rotation amount of a dial knob.

BACKGROUND ART

In general, a vehicle air vent typically includes an air vent housing provided with an air channel, a damper for opening or closing the air channel of the air vent housing, and a knob for operating the damper.

Such a vehicle air vent generally adopts a sliding type knob or a dial type knob in order to operate the damper, wherein the use of the dial type knob requires an operation member, which connects the damper to the dial knob.

Reviewing a prior art air vent, which uses a dial type knob, with reference to Korean registered patent publication No. 10-0736981, there has been developed and used a technique, in which a knob 6 is rotatably mounted on the outside of a duct 5, and a damper rod 8 has one end coupled with the outside of the knob 6 and the other end connected to a damper link 7 for rotating a damper (not shown), which is rotatably provided to the inside of the duct 5, such that the air channel of the duct 5 is opened or closed while the damper rotates by the rotation force of the knob 6, as shown in FIG. 1.

Meanwhile, in the vehicle air vent described above, it is difficult to open or close the air channel by a single damper if the width of the air channel of the air vent housing is wide. Therefore, a separation partition wall is provided in the center of the inside of the air vent housing and one pair of dampers, which simultaneously operate by the dial knob, is provided so as to open or close the air channel.

However, such an air vent as above has a problem that since a plurality of link members is used to connect the dial knob and the dampers, the number of required parts is increased making the manufacture of the air vent complicated and the simultaneous operation of the dampers cannot be realized smoothly.

Therefore, in order to solve the above problems, there has been developed and used a dual damper device of a vehicle air vent, of which patent right is owned by the present applicant under the registered Patent No. 10-1409532. The dual damper device of a vehicle air vent includes: a duct housing 10 having a separation partition wall 14, which is provided inside so as to divide an inner air channel 13 into two parts, an introduction part 11 formed at one end portion and a discharge part 12 formed to be bent with an inclination at the other end portion; one pair of dampers 20 rotatably provided to the inside of the air channel 13 in the introduction part 11 so as to open or close the air channel 13; a dial knob 30 rotatably provided to the outer surface of the discharge part 12 of the duct housing 10 and having an operation surface 32 provided to the front surface portion and an insertion hole 33 formed in the rear surface thereof; a dial bush 40 having a knob fitting part 41, which is formed at the upper portion thereof so as to be vertically coupled in the insertion hole 33 of the dial knob 30, and an elongated guide groove 42, which is provided to the inside thereof; one pair of damper bushes 50, each of which one end is vertically coupled with one end of each of the one pair of dampers 20, and the other end is formed with a link fitting hole 52; and a bush link 60 having a guide pin 61, which is protruded from the upper portion thereof so as to be fitted into the guide groove 42 of the dial bush, and bush fitting parts 62, which are formed at both sides of the rear surface thereof so as to be coupled into the link fitting holes 52 of the one pair of damper bushes 50, as shown in FIG. 2 to FIG. 4.

According to the dual damper device of a vehicle air vent, owned by the present applicant and constructed as above, the duct housing 10 is provided with the introduction part 11 and the inclined discharge part 12 such that the dial bush 40, the bush link 60 and the damper bushes 50 operate in response to the rotation of the dial knob 30 and rotate the dampers 20, such that the air channel 13 of the duct housing 10 is opened or closed.

However, the dual damper device of a vehicle air vent as above still has problems that, since the dial knob 30 and the dampers 20 have to be connected to each other by a plurality of connection members, the number of required parts is increased and thus the working processes thereof are increased in the assembly thereof. Further, it is difficult to accurately rotate the dampers 20 towards the position as desired by a user so as to introduce air through the introduction part 11 into a vehicle room by desired by a passenger.

DISCLOSURE OF INVENTION

Technical Problem

Accordingly, the present invention has been derived to solve the above-mentioned problems and disadvantages occurring in the prior arts, and it is an objective of the present invention to provide a dual damper device of a vehicle air vent, in which the opening or closing amount of the air channel of an air vent housing can be adjusted while a damper provided to the air channel of the air vent housing accurately rotates according to the rotation amount of a dial knob, in which a damper accurately rotates by the rotation amount of a dial knob so as to open or close the air channel of a duct such that a passenger in a vehicle room can open or close the air channel of a duct housing and accurately control the desired amount of the air, which is introduced into the vehicle room through a discharge part.

It is another objective of the present invention to provide a dual damper device of a vehicle air vent, in which the number of parts required for connecting a dial knob and a damper, thereby improving assembly.

Solution to Problem

To accomplish the above objectives, according to the present invention, there is provided a dual damper device or damper assembly of a vehicle air vent, which includes a dial knob coupled with a dial support so as to rotate in one side direction or the other side direction, a gear bush or shaft, of which an upper end portion is fixed and coupled to the bottom surface of the dial knob, a guide gear having a rack gear part, which is formed at one side portion thereof and engaged with a pinion gear part, which is formed at the lower portion of the gear bush, so as to move forwards or backwards, and a damper provided to an air channel of a duct housing so as to rotate in one side direction or the other side direction according to the forward or backward movement amount of the guide gear.

Meanwhile, the guide gear, which has the rack gear part formed at one side portion thereof so as to be engaged with the pinion gear part, has a coupling protrusion, which is formed to be protruded outwards at the other side portion thereof so as to be coupled with the damper.

Advantageous Effects of Invention

According to the dual damper device of a vehicle air vent constructed as above, if the dial knob is rotated, the gear bush rotates by the rotation amount of the dial knob, and the guide gear moves forwards or backwards by the rotation amount of the gear bush so as to rotate the damper such that the air channel of the duct housing is opened or closed. Therefore, a passenger in a vehicle room can accurately adjust the amount of the air introduced through the discharge part of the duct housing such that the vehicle room can be maintained at a pleasant state.

In addition, according to the dual damper device of a vehicle air vent constructed as above, the dial knob and the damper are connected to each other by the gear bush and the guide gear such that the number of parts can be reduced in the assembly work, thereby improving the workability and the like.

BRIEF EXPLANATION OF REFERENCE SYMBOLS

Figure 1:
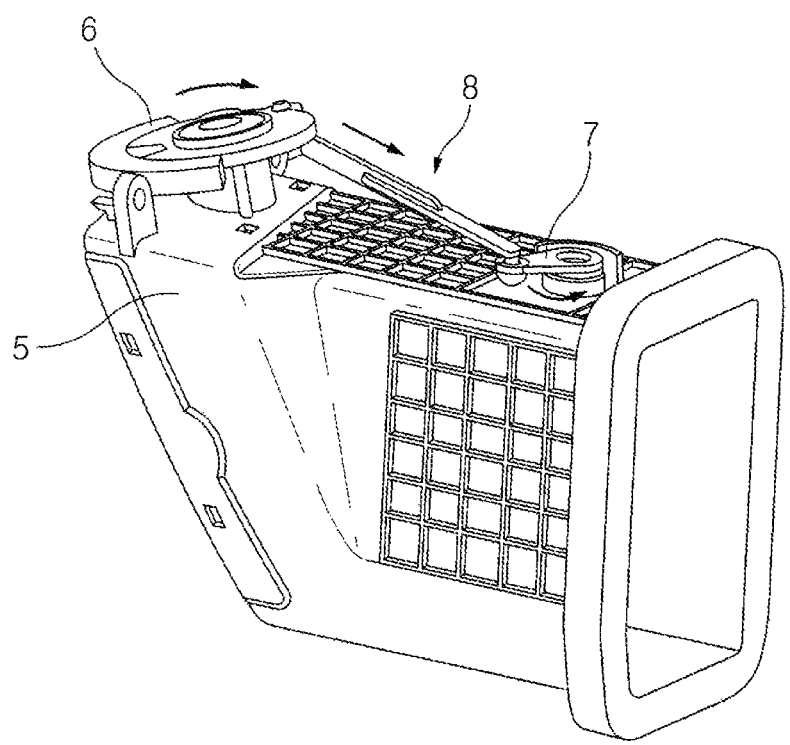
FIG. 1 is a perspective view for showing a prior art dual damper device of a vehicle air vent.
Figure 2:
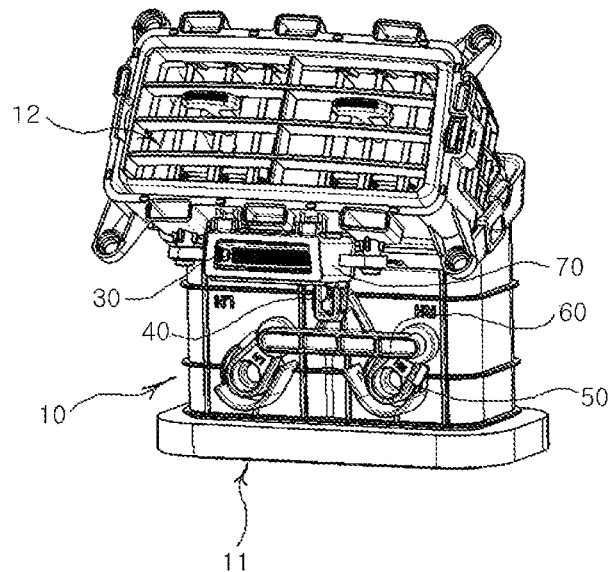
FIG. 2 is a perspective view for showing the whole construction of another prior art dual damper device of a vehicle air vent.
Figure 3:
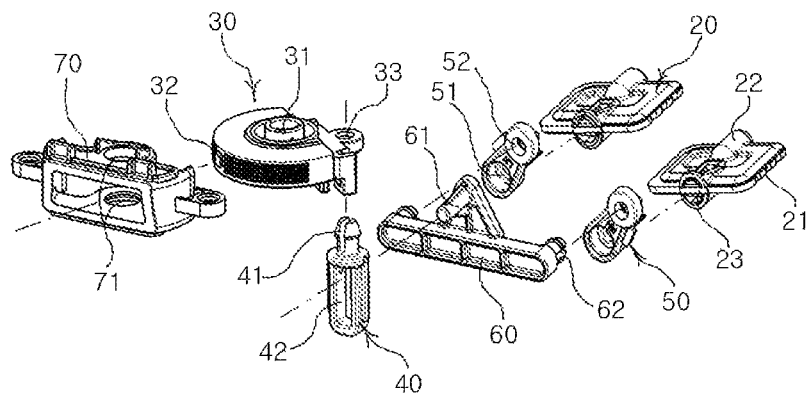
FIG. 3 is an exploded perspective view for showing principal parts of the prior art dual damper device of a vehicle air vent of FIG. 2.
Figure 4:
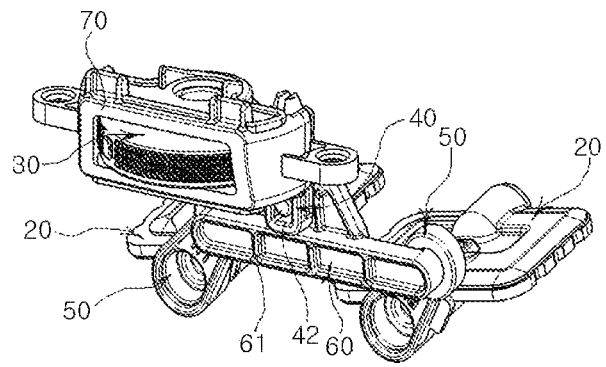
FIG. 4 is a perspective view for showing the principal parts of the prior art dual damper device of a vehicle air vent, in which the principal parts are in an assembled state.

100: dial knob 200: gear bush
210: pinion gear part 300: guide gear
310: rack gear part 320: coupling protrusion
400: damper 500: dial support
600: duct housing 610: air channel

BEST MODE FOR CARRYING OUT THE INVENTION

Hereinafter, reference will be now made in detail to the preferred embodiments of the present invention with reference to the attached drawings in a manner that the invention can be readily carried out by a person skilled in the art.

Figure 5:
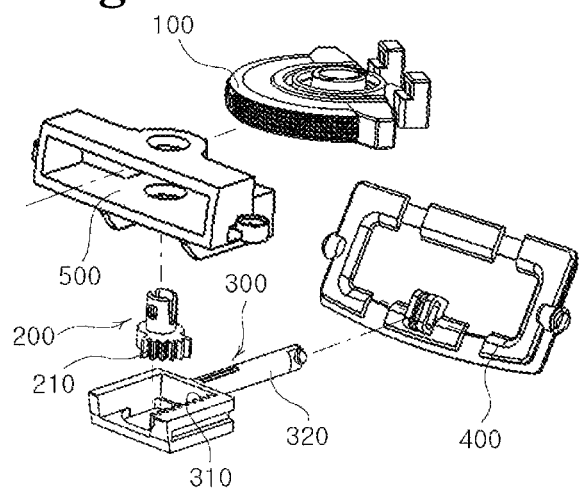
FIG. 5 is an exploded perspective view for showing the construction of a dual damper device of a vehicle air vent according to the present invention.
Figure 6:
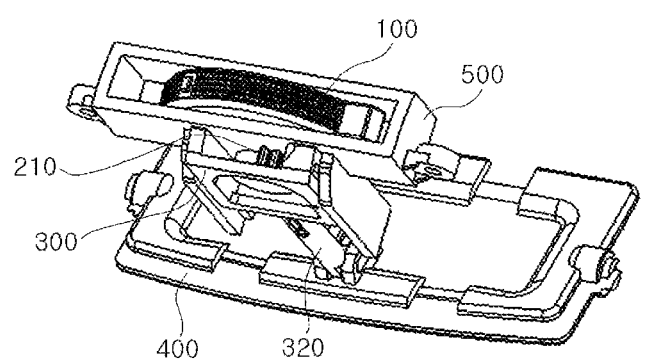
FIG. 6 is a perspective view for showing the construction of the dual damper device of a vehicle air vent according to the present invention.
Figure 7:
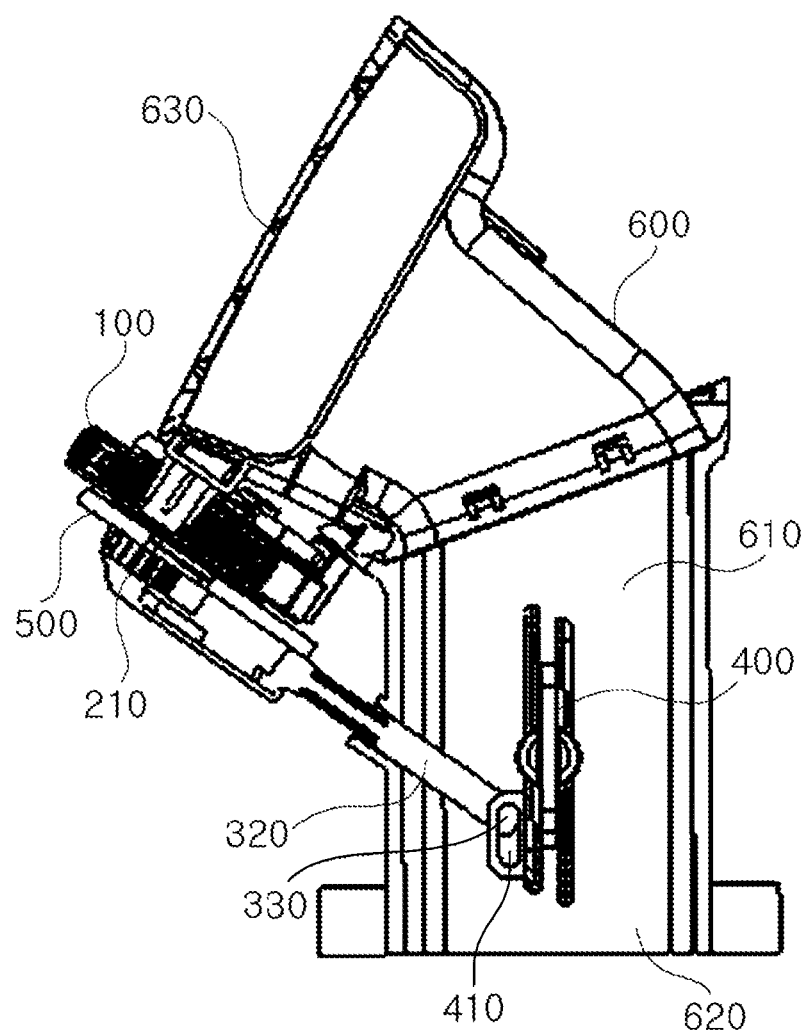
FIG. 7 is a side cross-sectional view for showing an operation state of the dual damper device of a vehicle air vent according to the present invention.

A dual damper device or damper assembly of a vehicle air vent according to the present invention includes a dial knob 100 coupled with a dial support 500 so as to rotate in one side direction or the other side direction, a gear bush or shaft 200, of which an upper end portion is fixed and coupled to the bottom surface of the dial knob 100, a guide gear 300 having a rack gear part 310, which is formed at one side portion thereof and engaged with a pinion gear part 210, which is formed at the lower portion of the gear bush 200, so as to move the guide gear 300 forwards or backwards, and a damper 400 provided in an air channel 610 of a duct housing 600 so as to rotate in one side direction or the other side direction according to the forward or backward movement amount of the guide gear 300, as shown in FIG. 5 to FIG. 7.

Meanwhile, the guide gear 300, which has the rack gear part 310 formed at one side portion thereof so as to be engaged with the pinion gear part 210, and has a coupling protrusion 320, which is formed to be protruded outwards at the other side portion thereof. The coupling protrusion 320 has a pair of projections 330 on one end and the pair of projections 320 engages the damper 400 via a pair of elongated holes 410 formed at a connecting part in the damper 400, so as to be coupled with the damper 400, as shown in FIG. 5 to FIG. 7.

In the dual damper device of a vehicle air vent according to the present invention, the dial knob 100 and the damper 400 are connected to each other by fixing and coupling the upper end portion of the gear bush 200 to the dial knob 100, which is rotatably coupled to the dial support 500, engaging the rack gear part 310 formed at one side portion of the guide gear 300 with the pinion gear part 210 of the gear bush 200 and, after engaging the rack gear part 310 with the pinion gear part 210, coupling the coupling protrusion 320 formed at the other side portion of the guide gear 300 to the damper 400 via the pair of projections 330 of the coupling protrusion 320 and the pair of elongated holes 410 formed at the connection part in the damper 400. The damper 400 is provided to the air channel 610 of the duct housing 600, which has the introduction part 620 and the discharge part 630 formed to be inclined.

Therefore, in the case where a passenger in a vehicle wants to introduce the air, which is introduced through the introduction part 620 and the air channel 610 of the duct housing 600, to the inside of the vehicle through the discharge part 630, if the dial knob 100 is rotated, the gear bush 200 rotates in one side direction by the rotation amount of the dial knob 100, the guide gear 300, of which the rack gear part 310 is engaged with the pinion gear 210, moves in the center direction of the duct housing 600 by the rotation amount of the gear bush 200, and the damper 400 simultaneously rotates by the movement amount of the guide gear 300, such that the air channel 610 of the duct housing 600 is opened and the air introduced through the introduction hole 620 is discharged through the discharge part 630 and thus supplied to the inside of the vehicle.

Herein, the guide gear 300 moves according to the movement amount of the rack gear part 310, which is engaged with the pinion gear part 210 of the gear bush 200, and the damper 400 rotates by the movement amount of the guide gear 300, thereby opening the air channel 610. Therefore, a passenger in the vehicle can adjust the introduction amount of the air, which is introduced into the vehicle room, more accurately.

Meanwhile, in the case where the air, which is introduced into the vehicle room when the air channel 610 is opened as described above, is desired to be blocked, the dial knob 100 is simply rotated in the opposite direction from the rotation direction thereof described above.

That is, the gear bush 200 is rotated in the other side direction by the rotation amount of the dial knob 100, and the guide gear 300, of which the rack gear part 310 is engaged with the pinion gear part 210, moves by the rotation amount of the gear bush 200, and the damper 400 simultaneously rotates by the movement amount of the guide gear 300, such that the air channel 610 for the air, which is introduced into the duct housing 600, is blocked.

Therefore, the air, which is introduced into the air channel 610 of the duct housing 600 through the introduction part 620, is not discharged through the discharge part 630 and thus the air is not introduced into the vehicle room.

The invention claimed is:

1. A damper assembly of a vehicle air vent, comprising:
   a dial support;
   a dial knob having a rotational axis at a center portion thereof and coupled with the dial support so as to rotate in one direction or another direction on the rotational axis;
   a gear shaft arranged on the rotational axis of the dial knob, and having an upper end portion, in the rotational axis, coupled to a bottom of the dial knob, and a lower portion, in the rotational axis, having a pinion gear configured to rotate according to an amount of a rotation of a dial knob in one side direction or another side direction;
   a guide gear having a rack gear part at one side thereof and engaging the pinion gear so that the guide gear moves forward or backward according to an amount of a rotation of the pinion gear of the gear shaft in one side direction or another side direction, and
   a damper provided in an air channel of a duct housing so as to rotate in one side direction or another side direction, the damper being coupled to the guide gear so that the damper moves according to an amount of a forward or backward movement of the guide gear.

2. The damper assembly of a vehicle air vent according to claim 1, wherein the guide gear has a coupling protrusion protruding outwardly from a portion where the rack gear part is formed and coupled with the damper.

3. The damper assembly of a vehicle air vent according to claim 2, wherein the guide gear is slidably attached to the dial support.

4. The damper assembly of the vehicle air vent according to claim 2, wherein the coupling protrusion further comprises a projection on one end, the damper further comprises an elongated hole, and the projection of the coupling protrusion slidably engages the elongated hole of the damper so as to rotate the damper according to the amount of the rotation of the dial knob.

5. The damper assembly of the vehicle air vent according to claim 1, wherein the dial support includes an upper hole and a lower hole and the dial knob includes a through hole, the upper hole, the lower hole, and the through hole being arranged on the rotational axis of the dial knob,
   the gear shaft includes an upper portion protruding upwardly and passing through the upper hole, the lower hole, and the through hole, and
   the guide gear includes a coupling protrusion protruding outwardly in a direction crossing the rotational axis from the rack gear part.

6. The damper assembly of the vehicle air vent according to claim 5, wherein the damper includes another rotational axis perpendicular to the rotational axis of the dial knob such that the dial knob and the damper rotate in directions perpendicular each other.

* * * * *